Sept. 22, 1964     H. KLEINDIENST     3,149,503
CONNECTING ROD CONSTRUCTION
Filed Nov. 2, 1960
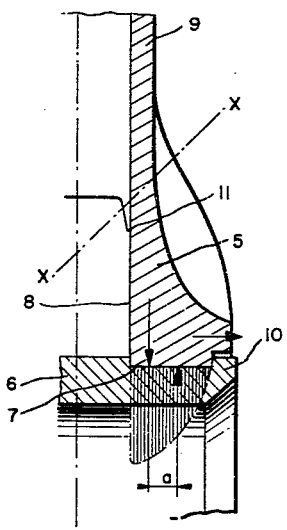
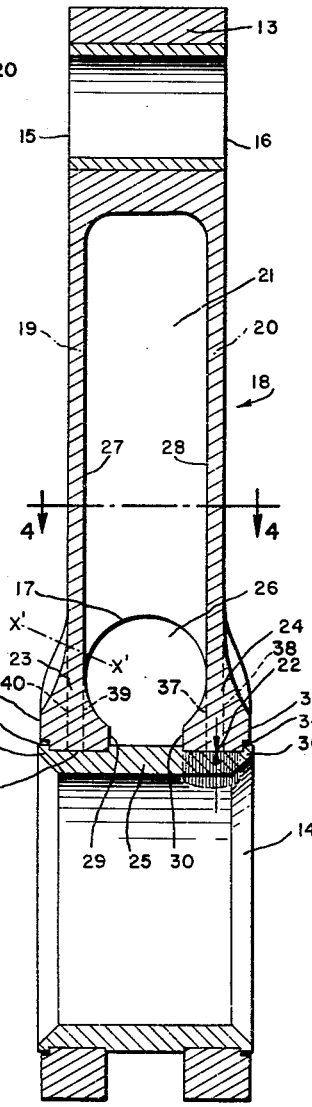
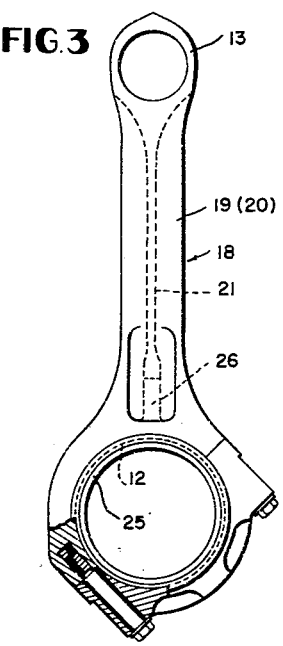
INVENTOR
HERBERT KLEINDIENST
BY *Dicke, Craig and Freudenberg*
ATTORNEYS 3,149,503
CONNECTING ROD CONSTRUCTION
Herbert Kleindienst, Fellbach, near Stuttgart, Germany, assignor to Daimler-Benz Aktiengesellschaft, Stuttgart-Unterturkheim, Germany
Filed Nov. 2, 1960, Ser. No. 66,714
Claims priority, application Germany Nov. 10, 1959
6 Claims. (Cl. 74—579)

The present invention relates to a connecting rod provided with a blade portion constructed in a fork-like manner at the crank end thereof and having an I-shaped cross section, for piston type reciprocating engines, especially high-speed internal combustion engines.

The present invention, in addition to seeking to provide an improvement in the holding or clamping surface conditions between the crank pin boss of the connecting rod and the bearing shells or the bearing brasses of the connecting rods, aims at a simplified machining of the connecting rods used in relatively large and high-speed diesel engines.

The blade portion of a known connecting rod, constructed at the crank end in a fork-like manner, is provided with an I-shaped cross section whereby the flanges of the blade extend either perpendicular or parallel to the end faces of the wrist pin bosses or gudgeon pin bosses and are offset in the inward direction. However, the result is for the case of connecting rod heads between which also a blade rod of a forked-rod and blade-rod assembly is to move unobjectionably, dimensions and constructional shapes which have proved themselves disadvantageous. Because, by reason of the relatively close adjacent arrangement of the flanges as well as of the exclusively outwardly directed connecting rod heads, eccentrically acting forces occur at the holding or clamping surfaces which lead to deflection movements of the connecting rod heads, to the so-called throbbing. Moreover, in such an assembly, places of fretting corrosion occur as a result thereof at the bearing shell surfaces that face the holding or clamping surfaces of the connecting rod heads. Consequently there exists, with an advanced fretting corrosion, the danger of crack formation at the transition places of the flanges toward the connecting rod heads themselves which lead to breakage of the connecting rods and connecting rod heads. Photoelastic stress analyses have proved that with such connecting rod constructions there occur bending stresses having a harmful effect which lead to a buckling of the flanges, and to an uneven stress distribution over the width of the blade portion. It has been determined in connection therewith that the determined excessive loads and stresses coincide exactly with the places of fretting corrosion which were found to be relatively large during engine operation.

The purpose of the present invention is to eliminate the aforementioned shortcomings and inadequacies and essentially consists in directing the extensions of the flanges of the blade portion toward the center of the holding or clamping surfaces of the bearing shells or brasses of the connecting rod.

By reason of the fact that the flanges of the blade portion extend rectilinearly from the end surfaces or faces of the wrist pin boss to the bifurcation formed by a circularly-shaped recess in the web portion, whereby the distance between the outer boundary surfaces of the flanges which preferably remains constant to the point of bifurcation of the blade portion is equal to the width of the wrist pin boss up to the bifurcation of the blade portion, and by reason of the fact that the flanges pass over at the fork-shaped end into T-shaped connecting rod heads, whereby the holding or clamping surfaces thereof are dimensioned equally or approximately equally from the center thereof, an even pressure distribution can be achieved at the holding or clamping surfaces. The use of this construction of the connecting rod heads as well as of the circularly-shaped recess in the web portion of the connecting rod assures that no one-sided loads occur at the holding or clamping surfaces so that no fretting corrosion can occur at the bearing shells or brasses of the connecting rods since the so-called throbbing of the connecting rod heads remains absent whereby breakages in the connecting rod heads are avoided. Additionally, a considerable stress decrease takes place at the transition of flanges toward the connecting rod heads so that breakages can arise no longer at the transition point of the blade portion to the connecting rod heads.

Since the width of the wrist pin bosses corresponds to the width of the blade portion up to the transition of the flanges into the connecting rod heads, the machining of the blade portion can be undertaken simultaneously with that of the end faces of the wrist pin bosses by one and the same machining operation. The recesses provided along the outer boundary surface of the connecting rod heads in which are guided the collar portions arranged at the bearing shells, served in the prior art connecting rod constructions for the accommodation of the collars constructed as abutment or supporting edges which, during the deflection movements of the connecting rod heads, have to absorb forces that are directed outwardly. According to the present invention, the collar portions lose their significance as abutment or supporting edges since the same are no longer necessary by reason of the construction of the connecting rod heads. Therefore an enlargement of the holding or clamping surfaces and therewith a smaller specific surface pressure is achieved by a relatively small dimension of the recesses as well as of the collars. The collar portions engaged within the annularly-shaped recesses serve, therefore, exclusively for purposes of retaining or holding the bearing shells or brasses of the connecting rod and thus avoid the actual displacement of the bearing shells or brasses on the crank pins and therewith the fretting corrosion on the crank pins.

Accordingly, it is an object of the present invention to provide a connecting rod construction which eliminates the disadvantages and shortcomings of the prior art constructions.

It is another object of the present invention to provide a connecting rod construction, especially for high speed internal combustion engines provided with a blade of fork-like configuration at the crank end thereof which brings about an improvement in the holding or clamping surface conditions between the crank pin bosses and the bearing brasses of the connecting rod.

Still another object of the present invention resides in the provision of a connecting rod construction which enables a simplified machining thereof, especially with relatively large, high-speed diesel engine constructions.

Still another object of the present invention resides in the provision of a connecting rod construction provided with a blade portion of fork-like configuration at the crank end thereof which provides a better force distribution, particularly at the holding or clamping surfaces while simultaneously therewith eliminating eccentric forces likely to produce deflection movements of the connecting rod heads that result in the so-called throbbing.

Still a further object of the present invention resides in the provision of a connecting rod construction in which the danger of fretting corrosion or brinnelling is significantly reduced whereby also the danger of bending and buckling at the transistion places subject to bending stresses is for all practical purposes eliminated.

Another object of the present invention resides in the provision of a connecting rod construction which enables the attainment of an improvement in the specific surface pressure at the holding or clamping surfaces.

These and other objects, features and advantages of the present invention will become more obvious from the following description when taken in connection with the accompanying drawing which shows, for purposes of illustration only, one embodiment in accordance with the present invention, and wherein FIGURE 1 is a partial cross sectional view through the connecting rod head of a prior art connecting rod construction together with a diagrammatic showing of the pressure distribution at the holding or clamping surfaces, FIGURE 2 is a cross sectional view through a connecting rod according to the present invention whereby the pressure distribution is again diagrammatically indicated therein at the holding or clamping surfaces on the right connecting rod head, FIGURE 3 is an elevational view at right angle to FIGURE 2, illustrating, on a reduced scale, a connecting rod in accordance with the present invention, and FIGURE 4 is a horizontal sectional view taken through line 4—4 of FIGURE 2.

Referring now to the drawing, and more particularly, to FIGURE 1, this figure illustrates a connecting rod head of a known connecting rod construction. The pressures which are transmitted during operation to the bearing shells 6 by means of the holding or clamping surfaces 7 of the connecting rod head 5, extend, as shown in the graphic representation of the pressure distribution, according to a very steep curve whereby the holding or clamping surface 7 represents the abscissa in the drawing. The largest pressure thereby prevails almost at the inner surface 8 of the extension of the flange 9 and the smallest pressure at the outer boundary edge of the holding or clamping surface 7. As a result of the lateral displacement of the largest pressure component from the center of the holding or clamping surface 7, indicated in FIGURE 1 by the distance $a$ between oppositely directed arrows, as well as by reason of the deflection movements of the flanges 9, there occur, on the one hand, fretting corrosion places or spots on the surface of the bearing shell 6 that faces the holding or clamping surface 7. With a far advanced fretting corrosion, the cross section of the flange 9, which normally is already subjected heavily to loads and stresses, is loaded even more strongly in bending at $x$—$x$ so that breakages occur in the connecting rod heads and at or near the location thereof indicated by the line $x$—$x$. Furthermore, considerable forces are transmitted during the movement of the connecting rod head 5 in the direction toward the collar portion 10 of the bearing shell 6, as indicated by the horizontal arrow in FIGURE 1, so that the collar portion 10 of the prior art construction of FIGURE 1 has to be dimensioned correspondingly strong. Consequently, the clamping surface 7 is reduced by such measure that the specific surface pressure is increased. Additionally, by reason of the machining of the inner surfaces 8 formed along the web connecting with each other the flanges 9, there occur sharply defined machining edges such as at 11 which are the cause of notch stresses having harmful effects.

In contradistinction thereto, as may be readily seen from the graphic representation of the pressure distribution at the holding or clamping surfaces 12 on bearing shell 25 of FIGURE 2, an even loading is exerted on the bearing shell or brasses of the construction in accordance with the present invention. The connecting rod illustrated in FIGURE 2 constructed in accordance with the present invention is provided at one end thereof with the wrist pin boss 13 and at the other end thereof with a split crank-pin boss 14 whereby the width of the wrist pin boss 13 corresponds to the width of the connecting rod blade generally designated by reference numeral 18. The blade portion extends from the end faces 15 and 16 of the wrist pin 13 in essentially rectilinear direction toward the crank-pin boss 14 down to the region of the bifurcation 17. The blade portion 18 which has an I-shaped cross section (see FIG. 4), consists of the flanges 19 and 20 the extensions of which are directed toward the center 22 of the holding or clamping surfaces 12. The flanges 19 and 20 are provided with connecting rod heads 23 and 24. The aforesaid extensions are comprised by the portions of rod heads 23 and 24 constituting in effect continuations of the flanges 19 and 20, these portions being indicated in the rod head 23 of FIGURE 2 by the dot-dash lines 39 and 40 and in the rod head 24 by the dot-dash lines 37 and 38. These lines with the inner and outer boundary surfaces of the flanges 19 and 20 extend in planes perpendicular to the axis of shell 25, these planes defining, within said fork-shaped portions, extensions of said flanges, the ends of said extensions impinging upon said holding surfaces substantially midway of the axial extent of each of said surfaces.

The heads 23 and 24 are constructed in a T-shaped manner, the upper portions of the rod head merging with the flanges 19 and 20 in the region of the bifurcation 17, these flanges being interconnected by a web 21. A circularly shaped recess 26 is provided at the end of the web portion 21 facing the bearing shell 25 and is adapted to receive the crank-pin boss of a blade rod (not shown) of a forked-rod and blade-rod assembly. The diameter of the recess 26 corresponds to or approximately corresponds to the distance between the mutually facing surfaces 27 and 28 of the flanges 19 and 20, respectively. Additionally, the distance between the mutually facing side surfaces 29 and 30 of the connecting rod heads 23 and 24 corresponds to the width of the blade rod (not shown) provided therebetween.

Annularly-shaped recesses 33 and 34 are provided along the outer boundary surfaces 31 and 32 of the connecting rod heads 23 and 24 and serve exclusively for purposes of retaining the bearing shells or brasses 25. The recesses guide the correspondingly constructed collar portions 35 and 36 of the bearing shells 25. During machining of the mutually opposite side surfaces 29 and 30 of the connecting rod heads 23 and 24 no sharp machining edges can occur in the course of the machining run-out of the tool bit by the arrangement of the recess 26 in the web portion 21, and therewith no notch stresses can occur at the transitions from the flanges 19 and 20 toward the connecting rod heads 23 and 24.

The photo-elastic stress analyses, also undertaken with a connecting rod according to the present invention, have established that the stress distribution in the holding or clamping surfaces thereof is much more favorable than in the known connecting rod constructions, and that the bending loads and stresses at the cross section $x'$—$x'$ (FIGURE 2) are reduced considerably by the construction of the connecting rod heads 23 and 24 and the provision of the annularly-shaped recess, so that breakages at $x'$—$x'$ and in the connecting rod heads cannot occur in a construction according to the present invention.

While I have shown and described one embodiment in accordance with the present invention, it is understood that the same is not limited thereto but is susceptible of many changes and modifications within the spirit and scope of the present invention, and I therefore do not wish to be limited to the details shown and described herein but intend to cover all such changes and modifications as are encompassed by the scope of the appended claims.

I claim:

1. A connecting rod for reciprocating engines, especially high-speed internal combustion engines, comprising a blade portion, the crank end of said blade portion comprising a fork-shaped portion, said blade portion having an I-shaped cross section and comprising flanges, tubular wrist pin boss means at the other end of said blade portion, said flanges extending perpendicularly to the axis of said wrist pin boss means, web means connecting said flanges, said web means having a width less than the axial length of said tubular wrist pin boss means, said flanges having outer boundary surfaces coplanar with the end surfaces of said wrist pin boss means and extending to said fork-shaped portion, bearing means engaged by said fork-shaped portion and effectively forming holding surfaces, said flanges having inner boundary surfaces, said outer and said inner boundary surfaces extending in planes perpendicular to said holding surfaces, said planes defining within said fork-shaped portion extensions of said flanges, the ends of said extensions impinging upon said holding surfaces substantially midway of the axial extent of said respective surfaces.

2. A connecting rod according to claim 1, wherein a recess of essentially circular shape effectively forms the bifurcation of said fork-shaped portion.

3. A connecting rod according to claim 2, wherein said recess is adapted to accommodate therein a blade rod of a forked rod and blade-rod assembly, said inner boundary surfaces mutually facing each other, the diameter of said recess corresponding approximately to the distance between said inner boundary surfaces.

4. A connecting rod according to claim 1, wherein said fork-shaped portion comprises T-shaped connecting rod heads, annularly shaped cut-out portions being provided in the outer boundary surfaces of said connecting rod heads, and collar portions formed by said bearing means arranged in said cut-out portions, said cut-out portions and collar portions being of such dimension as to serve exclusively the purpose of retaining said bearing means in the proper position thereof.

5. A connecting rod according to claim 1, wherein said fork-shaped portion comprises connecting rod heads of substantially T-shaped cross section.

6. A connecting rod according to claim 5, wherein annularly shaped recesses are provided in the outer boundary surfaces of said connecting rod heads in which are guided collar portions formed by said bearing means, whereby said last mentioned recesses and said collar portions are so dimensioned that they serve exclusively for retaining said bearing means in the proper position thereof.

References Cited in the file of this patent

UNITED STATES PATENTS

| 1,581,083 | Gilman | Apr. 13, 1926 |
| 1,723,175 | Jones | Aug. 6, 1929 |
| 2,429,410 | Essl | Oct. 21, 1947 |

FOREIGN PATENTS

| 496,033 | France | Oct. 24, 1919 |

OTHER REFERENCES

Automotive Industries, pp. 528–529, Oct. 29, 1938.